US010120714B1

(12) United States Patent
Cabrera et al.

(10) Patent No.: US 10,120,714 B1
(45) Date of Patent: Nov. 6, 2018

(54) CUSTOMIZING COMPUTING RESOURCES FOR APPLICATION WORKLOAD

(75) Inventors: Luis Felipe Cabrera, Bellevue, WA (US); Eric Jason Brandwine, Haymarket, VA (US); James R. Hamilton, Seattle, WA (US); Jonathan A. Jenkins, Seattle, WA (US); Matthew D. Klein, Seattle, WA (US); Nathan Thomas, Seattle, WA (US); Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 906 days.

(21) Appl. No.: 13/461,030

(22) Filed: May 1, 2012

(51) Int. Cl.
- *G06F 9/50* (2006.01)
- *H04L 12/24* (2006.01)
- *H04L 12/911* (2013.01)

(52) U.S. Cl.
CPC ............ *G06F 9/50* (2013.01); *G06F 9/505* (2013.01); *G06F 9/5005* (2013.01); *G06F 9/5072* (2013.01); *H04L 41/0816* (2013.01); *H04L 41/0823* (2013.01); *H04L 41/0896* (2013.01); *H04L 41/5025* (2013.01); *H04L 47/781* (2013.01); *H04L 47/788* (2013.01)

(58) Field of Classification Search
CPC ......... G06F 9/50; G06F 9/5005; G06F 9/505; G06F 9/5072; G06F 9/3848; H04L 41/0816; H04L 41/0896; H04L 41/0823; H04L 41/5025; H04L 47/781; H04L 47/788

See application file for complete search history.

(56) References Cited

U.S. PATENT DOCUMENTS

| | | | | |
|---|---|---|---|---|
| 6,006,033 A | * | 12/1999 | Heisch | G06F 8/445 711/125 |
| 2011/0185014 A1 | * | 7/2011 | Eccles | 709/226 |
| 2011/0276951 A1 | * | 11/2011 | Jain | 709/224 |
| 2012/0137002 A1 | * | 5/2012 | Ferris | G06F 9/5072 709/226 |
| 2012/0159459 A1 | * | 6/2012 | Turner et al. | 717/138 |
| 2012/0204187 A1 | * | 8/2012 | Breiter et al. | 718/105 |
| 2013/0111032 A1 | * | 5/2013 | Alapati et al. | 709/226 |
| 2013/0212576 A1 | * | 8/2013 | Huang et al. | 718/1 |
| 2013/0318240 A1 | * | 11/2013 | Hebert et al. | 709/226 |
| 2014/0007128 A1 | * | 1/2014 | Schroth | G06F 9/50 718/104 |
| 2014/0321298 A1 | * | 10/2014 | Chow et al. | 370/252 |

\* cited by examiner

*Primary Examiner* — Nam T Tran
(74) *Attorney, Agent, or Firm* — Hogan Lovells US LLP

(57) ABSTRACT

A set of techniques for customizing resources for the workload of an application is described. The application can be received and hosted on a set of hardware and software resources of a service provider, which may include server instances, databases, load balancers and the like. Once the application is deployed and processing workload, it can be monitored to gather runtime trace information associated with the workload. This runtime trace information can be analyzed for potential optimizations and improvements to the set of resources or their configuration. Additionally, the user is enabled to input hardware/software specifications for the resources used to run the application. The service provider can use these specifications, along with the runtime trace information to optimize the resource stack used to execute the user's application.

25 Claims, 7 Drawing Sheets

CUSTOMIZING COMPUTING RESOURCES FOR APPLICATION WORKLOAD

BACKGROUND

As an ever increasing number of applications and services are being made available over networks such as the Internet, a number of content, application, and/or service providers are turning to technologies such as remote resource sharing and cloud computing. Cloud computing is a general term often used to describe the process of providing access to electronic resources through services, such as Web services, where the hardware and/or software used to support those services is made to be dynamically scalable to meet the needs of the services at any given time. A user or customer typically will rent, lease, or otherwise pay for access to resources through the cloud, and thus does not have to purchase and maintain the hardware and/or software to provide access to these resources. A service provider that owns those resources will usually take on the responsibility of maintaining and managing the resources, ensuring that they are highly available, scalable and otherwise ready to provide the necessary services.

In such cloud environments, multiple users often share resources such as remote server and storage devices. For example, an application owner may wish to deploy its application onto the resources of the service provider and enable the masses of end users to concurrently send multiple requests to be executed against the resources. Problems can arise, however, if the resources of the service provider are not particularly well suited to handle the specific needs of the application or services. For example, some applications may be very graphic-intensive, while other applications may utilize a lot of open network connections. As such, each of the various applications may call for different hardware/software resources, or configurations to optimize their functionality.

BRIEF DESCRIPTION OF THE DRAWINGS

Various embodiments in accordance with the present disclosure will be described with reference to the drawings, in which.

DETAILED DESCRIPTION

Figure 1:
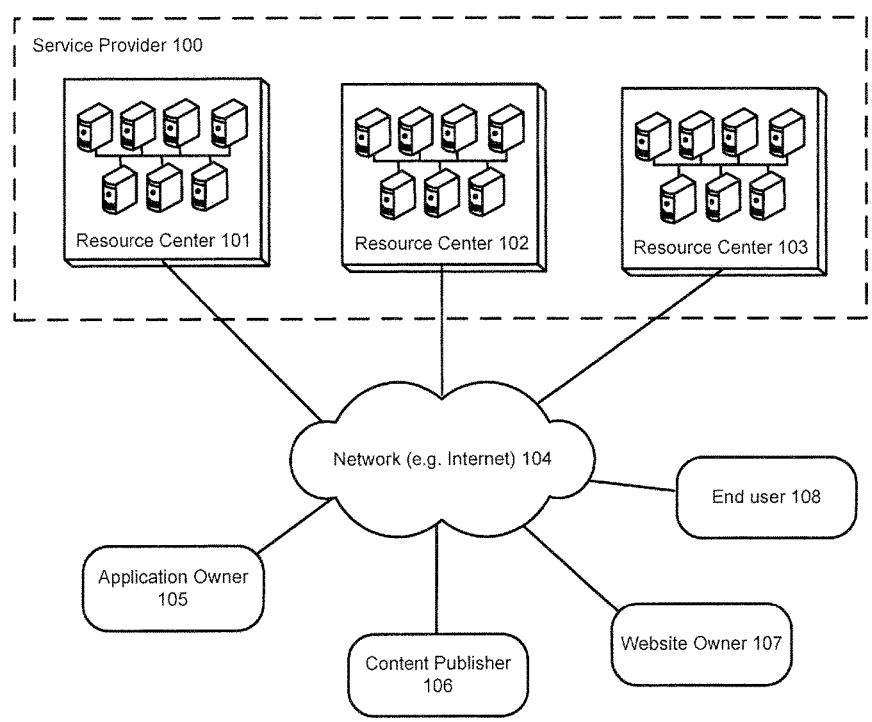
FIG. 1 is a general illustration of a service provider environment, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for managing and/or optimizing computer applications, services, and other such resources. In particular, the various embodiments provide approaches for customizing the resources that host an application or service in order to optimize those resources for the actual workload processed by the application.

In accordance with various embodiments, one such approach includes a customer providing an application to a service provider for hosting on the service provider's resources. The service provider can supply the shared resources in a multi-tenant computing environment for executing the customer's application, and for making the application available to various end users on a mass scale over the Internet and/or other such network (e.g., cellular and the like). When the service provider receives the application, the provider can deploy the application and execute the application on at least one server instance. In various embodiments, a server instance can include at least a portion of one or more physical server devices, or a virtual server instance (e.g. virtual machine), that will be responsible for hosting the application and managing its operations.

Once the application is running on resources of the service provider, the application can be assigned a set of workload to process (e.g. receiving and processing client request traffic). While the application resources are processing the workload, the service provider can gather and monitor the runtime trace information associated with the workload. For example, the service provider may monitor input/output (I/O) operations of the application, number of active connections, packets being processed by the application, central processing unit (CPU) utilization and a variety of other parameters.

When a predetermined amount of trace information has been gathered, the information can be analyzed for potential optimizations and improvements. In accordance with an embodiment, the service provider may design or suggest a new server instance (or other resources) based on the analysis of the runtime trace information of the application. For example, if the runtime trace information indicates that the application does not utilize certain kernel services, a new kernel can be constructed that does not include those services. As another example, if the runtime trace information indicates that the kernel of the server instance has been spending a large percentage of its CPU time handling network connections, the new customized design may include a direct-to-application networking path that includes a native network interface card (NIC) for the application. In addition, various functions can be pushed into hardware to increase performance and to reduce latency of the application. For example, the trace information may indicate that a subset of kernel code should be moved to a field programmable gate array (FPGA) of a new server device. As another example, the analysis of the trace information may suggest that a portion of application code should be executed on a graphics processing unit (GPU) instead of a standard CPU.

A variety of other examples are possible within the scope of the various embodiments described in this disclosure.

In accordance with another embodiment, the service provider may expose an interface for its customers to provide hardware and/or software specifications for its applications. For example, the service provider may receive a hardware specification for an application-specific integrated circuit (ASIC) from the customer using a hardware description language (HDL). Based on the customer's specification, the service provider can automate the process of creating the hardware, installing the hardware in the data center and allowing the customer to use the hardware for its application deployment.

FIG. 1 is a general illustration of an example service provider environment, in accordance with various embodiments.

As illustrated, a service provider 100 can offer to its customers a multi-tenant computing environment comprised of shared computing resources, such as physical servers/computers, virtual machines, raw (block) storage devices, firewalls, load balancers, networking equipment and a wide variety of other resources. In accordance with an embodiment, the service provider 100 can supply these shared resources on demand from its large pools installed in one or more resource centers (101, 102, 103). For wide area connectivity, a network (e.g. Internet) 104 can be used to connect and expose those resources to various users.

In accordance with an embodiment, a customer of the service provider, such as an application owner 105, content publisher 106, or website owner 107 may deploy and run their service(s) on the shared resources (e.g. servers, etc.) of the service provider 100. For example, the application owner 105 may install its operating system images as well as its application software on the physical machines located in one or more data centers of the service provider 100. In this embodiment, the customer may be responsible for maintaining the operating systems and application software. The service provider may bill on a utility computing basis, wherein the cost to the customer reflects the amount of resources consumed by the customer's particular application.

In accordance with various embodiments, the resource centers (101, 102, 103) may be provided by the service provider 100 or alternatively by one or more parties associated with the provider 100 (e.g. entities having a business relationship with the service provider). The various resource centers can include resources of the same or similar type or of different types. In accordance with an embodiment, the number of resources and/or resource centers can be scaled as necessary to support all of the customers and users of the service provider.

In accordance with various embodiments, the data centers (101, 102, 103) of the service provider can be distributed in several geographical regions and availability zones for purposes of lower latency and high availability. By way of example, availability zones can be distinct locations that are engineered to be insulated from failures in other availability zones and provide inexpensive, low latency network connectivity to other availability zones in the same region. By launching instances in separate availability zones, applications can be protected from failure of a single location. Regions may include one or more availability zones and may be geographically dispersed, and located in separate geographic areas or countries. For example, regions may include United States (US) East (Northern Virginia), US West (Oregon), US West (Northern California), EU (Ireland), Asia Pacific (Singapore), Asia Pacific (Tokyo), South America (Sao Paulo) and the like.

Figure 2:
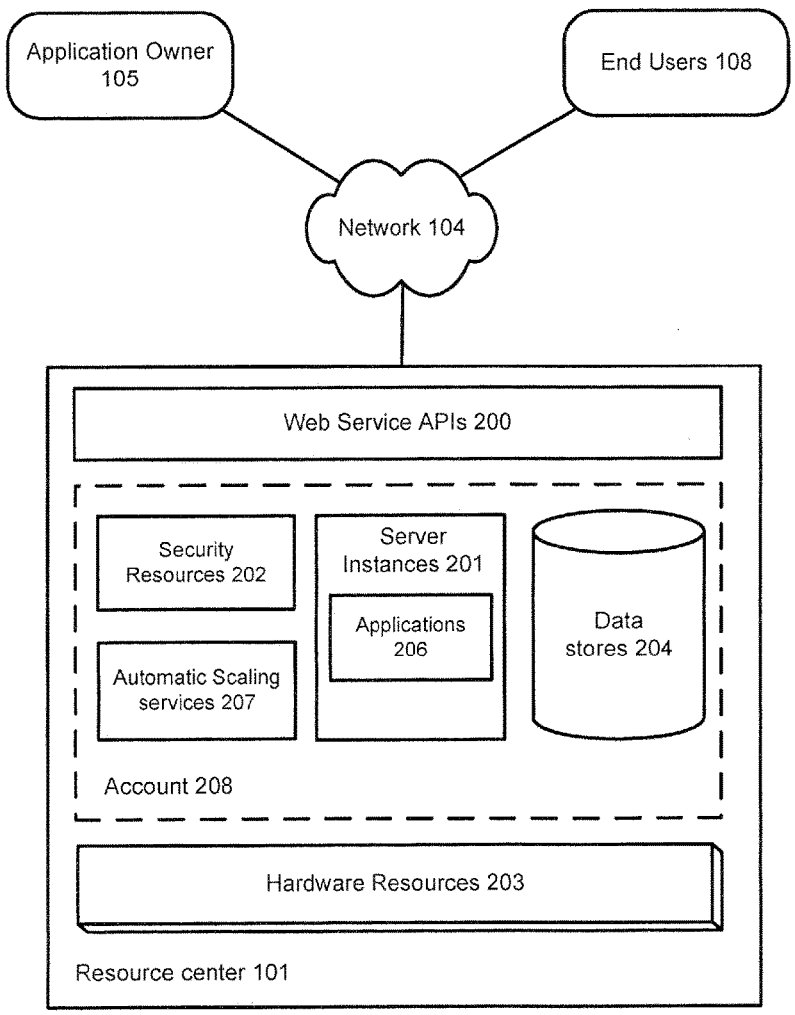
FIG. 2 is an illustration of the various resources provided by the service provider, in accordance with various embodiments.

FIG. 2 is an illustration of various resources that can be provided by a service provider, in accordance with various embodiments. As illustrated, the shared resources of the resource center 101 may include a set of physical hardware devices 203, including but not limited to computer servers, hubs, switches, bridges, racks, firewalls and other network devices. These devices are used to deploy and execute the applications 206 and services on behalf of various users (e.g. application owners 105) and to enable these applications to be made available to end users 108 on a mass scale.

The service provider 100 can supply a set of web service application programming interfaces (APIs) 200 that can be used by the application owner 105 to manage their applications and the resources being used to run the applications. The APIs 200 can provide resizable compute capacity (e.g. server capacity) on the network. For example, an application owner 105 can bundle the operating system, application software and associated configuration settings into a machine image. These machine images can then be used to provision one or more virtualized server instances 201 which will run the customer's applications 206. Additionally, the server instances 201 can be decommissioned using simple web service calls to scale capacity up and down quickly, as the capacity requirements of each application change. In certain embodiments, an automatic scaling service 207 can be configured to manage the scaling needs of the application, automatically provisioning additional server instances when the workload of the application increases and removing server instances when workload decreases.

In accordance with one embodiment, each of the server instances 201 is a virtual server instance assigned as a unit of compute capacity to the application owner 105 and used by the service provider to measure the hardware resource 203 consumption. In accordance with alternative embodiments, the server instances 201 may be the actual physical devices that run the applications 206 on behalf of the customer.

In various embodiments, the service provider 100 may provide server instances 201 on a per-hour charging basis, for one-time payment or create a market place for customers bid for unused capacity of the various server instances. Instances 201 can be launched in one or more geographical regions. Each region may have multiple availability zones which are distinct locations that are engineered to be insulated from failures in other availability zones.

In accordance with an embodiment, each server instance 201 may be assigned a role at boot time. For example, an instance can be designated a database server, an application server, a slave server and the like. The role may be passed in as an argument during launch that instructs the server instance to perform a sequence of steps after it has booted. On boot, a server instance can retrieve the necessary resources (e.g. code, scripts, configuration, etc.) based on the role assigned to it and the instance can attach itself to a cluster to serve its function (e.g. execute the application).

In accordance with an embodiment, each application owner 105 can be assigned an account 208 by the service provider. The account 208 can contain all of the resources utilized by the application owner, including server instances 201, data stores 204 (e.g. databases, content management systems, etc.), security resources 202 (e.g. policies, groups, user identities, etc.), scaling services 207 and the like. The account can be a secured account, wherein access to it is controlled and restricted to a selected group of users that may access and manipulate the various resources of the account.

Figure 3:
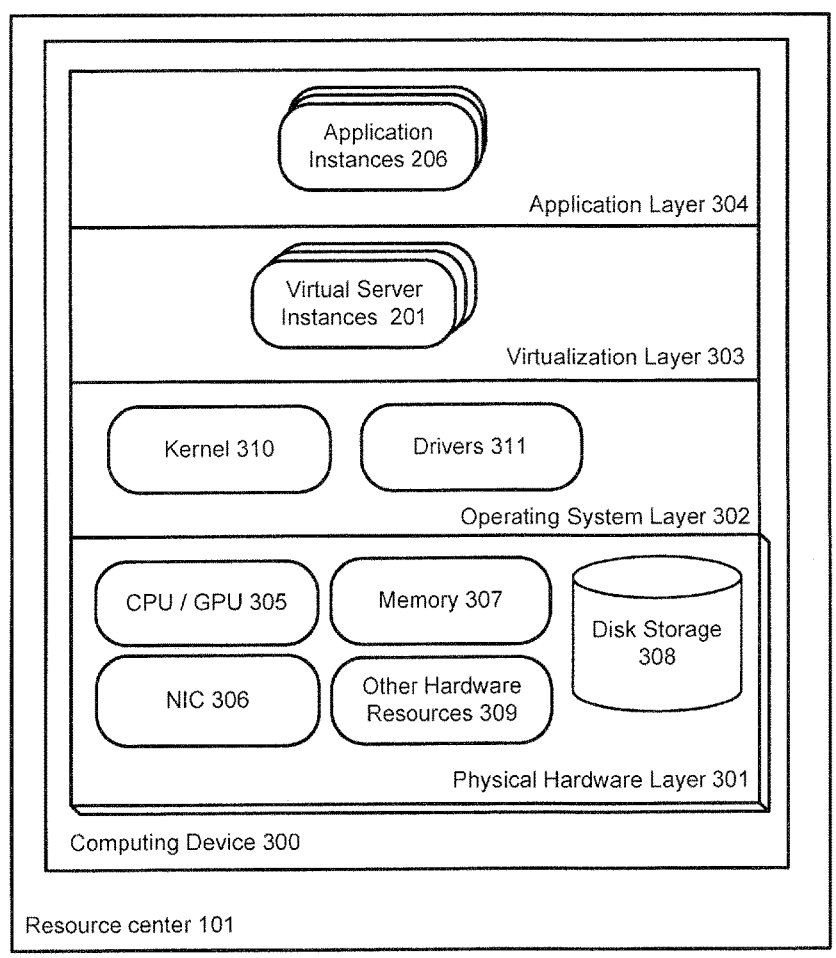
FIG. 3 illustrates an example of the architecture of a computing device that can be used to run an application on a service provider's data center, in accordance with various embodiments.

FIG. 3 illustrates an example of the architecture of a computing device that can be used to run an application on a service provider's resource center, in accordance with various embodiments. As illustrated, a computing device 300 may comprise a physical hardware layer 301 which includes one or more central processing units (CPUs) or graphics processing units (GPUs) 305, random access memory (RAM) 307, disk storage 308, network interface card (NIC) 306 or other communications mechanism and any other hardware needed to run the customer's application or services.

Above the hardware layer, the device can include an operating system (OS) layer 302 that includes the kernel 310 and the necessary drivers 311 to enable the applications and other computer programs running on the device to communicate with resources in the hardware layer. The device can further include a virtualization layer 303 that executes one or more server instances 201. The virtualization layer can enable a computing environment that allows users to use web service interfaces to launch server instances with a variety of operating systems, load them with the custom application environment, manage the network's access permissions, and run the applications using as many or few systems as desired. In accordance with an embodiment, above the virtualization layer, the device may also include an application layer 304 for executing the various customer application instances 206.

Figure 4:
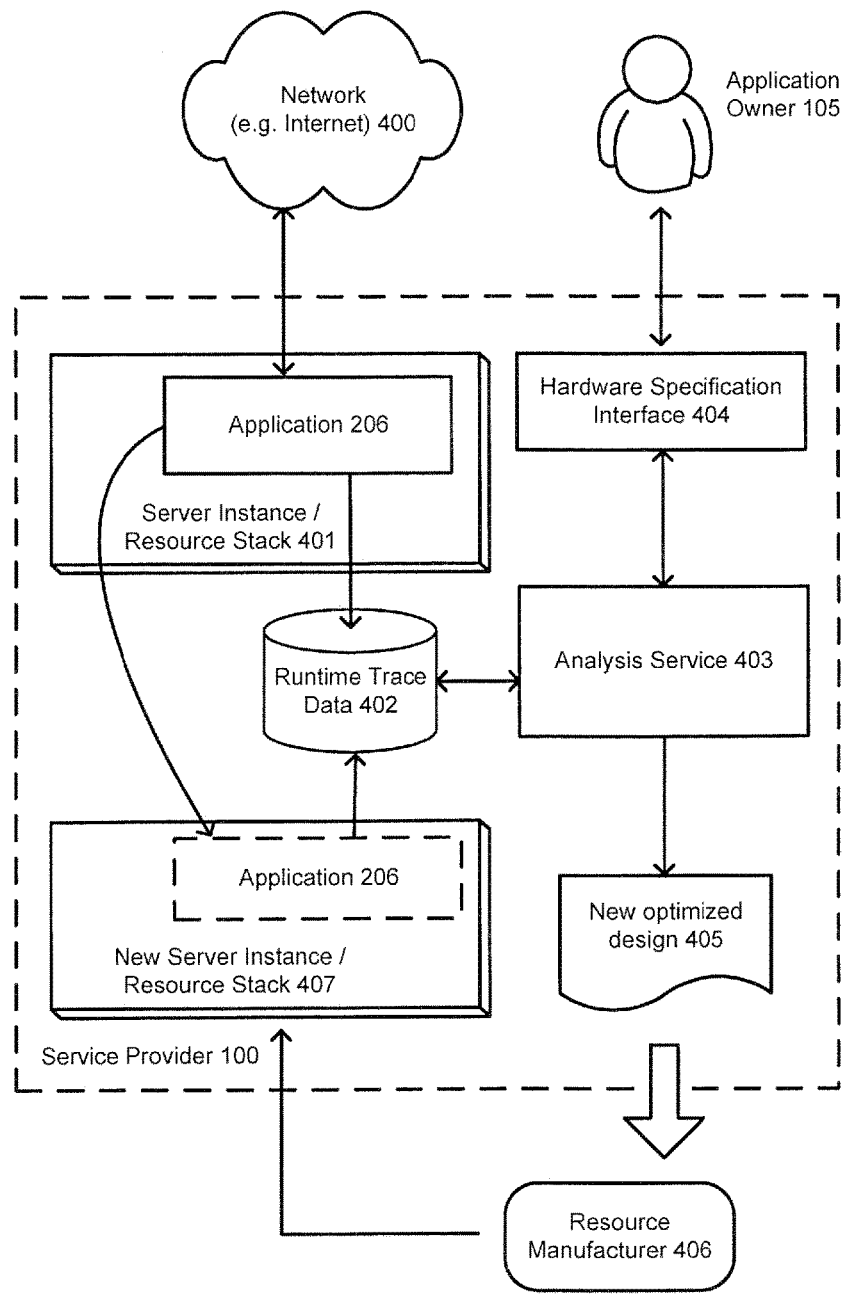
FIG. 4 is an example illustration of customizing a resource (e.g. server instance) for application workload, in accordance with various embodiments.

FIG. 4 is an example illustration of a resource (e.g. server instance) that is being customized for application workload, in accordance with various embodiments.

As illustrated, an application 206 can be deployed and executed on a stack of resources that includes one or more server instances 401. Once the application has been deployed, the system can monitor the workload of the application and collect runtime trace information 402 associated with the workload. For example, as the application is receiving and processing request traffic from the Internet 400, a set of various parameters on the server instance can be monitored and collected for statistical analysis. All of the collected trace information can be fed into an analysis service 403 (or other module) that analyzes the data and determines potential changes and modifications that could be made to the resource stack running the application to improve performance.

In accordance with various embodiments the potential changes can include a wide variety of modifications to the software and/or hardware of the resource stack 401. For example, in one embodiment, the runtime trace information can be used to assist the compiler with code generation and optimization. This may be efficient since the compiler can use the knowledge of the actual workload of the application during branch prediction (e.g. knowing which branch of code will be executed most frequently by the application workload) and in optimizing the instruction sequence of the executable based on the actual workload. In this embodiment, the application itself can thus be re-compiled and executed on the resource stack in a more optimized form.

In another embodiment, the runtime trace information may be used to determine that certain services, device drivers or other code designed to interact with the hardware is not used by the workload. Based on this information, a kernel can be constructed which excludes those services, device drivers or other code. The new kernel can then be added/replaced on the resource stack 401 to execute the application.

In another embodiment, the runtime trace information may be used to determine that the workload is spending a large percentage of its time (e.g. 40%) in the kernel handling networking traffic. In response to this determination, the NIC can be mapped directly to the guest operating system running on the service provider's hardware resource. This can provide a more aggressive networking optimization for the workload of the application.

In another embodiment, some of the hardware resources of the service provider may include field programmable gate arrays (FPGAs). The runtime trace information can be used to make a decision to move some kernels of the code to an FPGA to improve the speed and performance of that code.

In another embodiment, one or more special purpose hardware devices can be added to the server executing the application, depending on the runtime trace information that was collected. For example, if the workload of the application involves a substantial amount of graphics processing, one or more graphics processing units (GPUs) can be added to the server and some of the kernels can be executed on the GPUs for improved performance.

In accordance with various embodiments, based on the potential changes, the service provider can produce a new optimized design 405 of the resource stack, specifically tailored for executing the customer's application 206. The service provider can then automate the creation of the new resources 407 or modifying the existing resources in the stack, such as by providing the appropriate specifications to external resource manufacturers and the like.

In addition, or in the alternative, the service provider 100 can expose a hardware specification interface 404 to allow its customer (e.g. application owner 105) to input their own desired hardware/software specifications for running the application 206. In one embodiment, this interface can provide suggestions to the application owner based on the collected workload trace information, as well as receive custom input from the application owner. Based on a combination of these inputs and the statistical analysis of the application workload, the service provider can produce designs or configurations of the resources that will execute the application. In one embodiment, the service provider can produce the design dynamically based on the runtime information. In an alternative embodiment, the service provider may select from a library of pre-build designs or configurations which have been created in the past based on historical patterns, workloads, gathered runtime trace information or other data. In accordance with at least one embodiment, the customer can input a hardware specification on the interface 404 and the service provider can automate the process of creating an application-specific integrated circuit (ASIC) from the manufacturer for the application. In an alternative embodiment, the application owner may be given an option via interface 404 to upgrade the resource stack 401 to a new optimized stack 407 that is specifically configured for the workload being handled by the application.

In accordance with an embodiment, once the new resource stack (e.g. new server instance) is produced, or existing resource stack is modified, the application 206 can be migrated to the new resource stack 407. In one embodiment, the migration can be performed live, while the application is processing requests, such as for example by deploying another instance of the application on the new resource stack and routing all new requests to the new resource stack and allowing the previous old instance of the application to complete processing the in-flight requests before taking it offline.

In accordance with an embodiment, after the application is migrated to the new resource stack, the system can continue monitor the new version of the application and collect runtime trace information associated with the workload of the application that was migrated to the new stack. The collected trace information can be provided to the analysis service 403 (or other module) that can continue to analyze the data potentially optimize the resource stack again in the future, should the workload of the application change for example.

Figure 5:
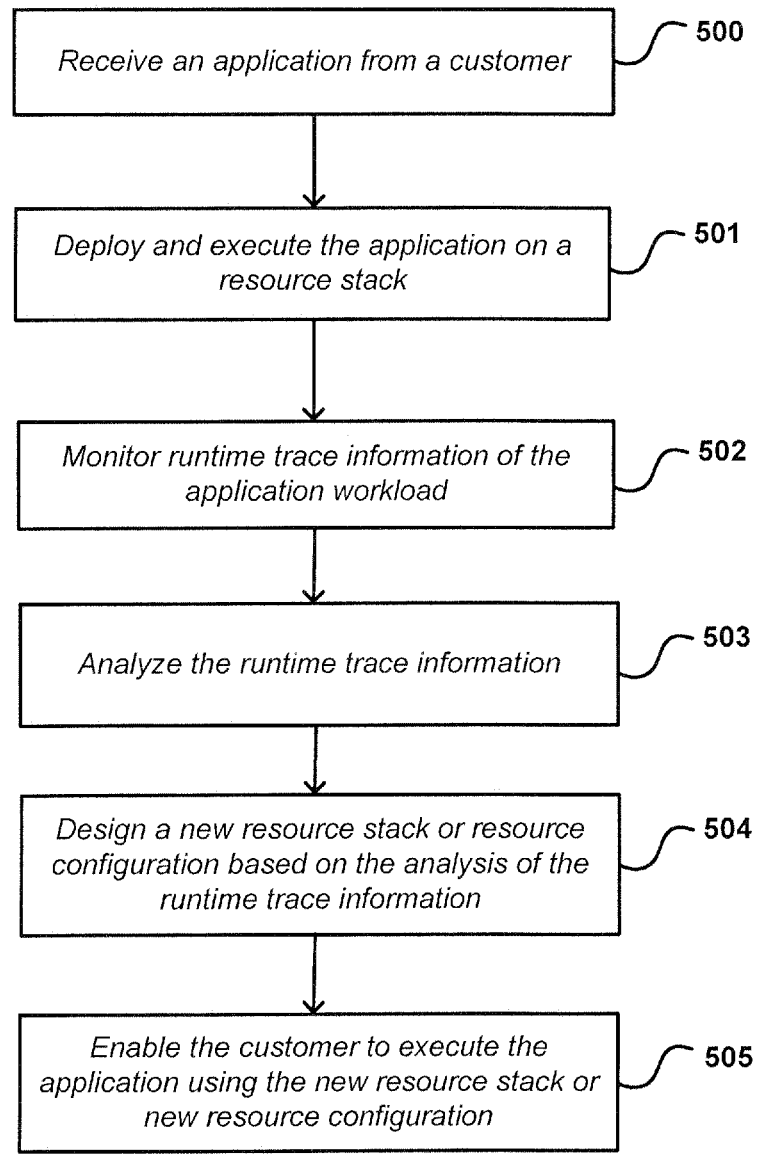
FIG. 5 illustrates an example process for customizing resources for application workload, in accordance with various embodiments.

FIG. 5 illustrates an example process for customizing resources for application workload, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 500, the service provider receives an application from a customer to be hosted on the network and resources of the service provider. The application can offer any service(s) to end users or other entities, including but not limited to electronic commerce, social networking, media distribution, data analytics, gaming, banking or financial services, educational services and the like.

In operation 501, the application is deployed and executed on a resource stack of the service provider. In accordance with an embodiment, the resource stack can include at least one server instance (e.g. virtual server instance) for executing the application. In addition, the resource stack may include database instance(s), load balancer(s), security resource(s) and any other resource useful for executing the application. Upon deployment, the application can begin to process its runtime workload. For example, the application may begin receiving request traffic from the network and issuing responses to the various recipients.

In operation 502, the runtime trace information of the application workload is monitored and collected by the system. In accordance with an embodiment, the system can monitor the cache hit ratio in caches of the server instance running the application, input and output (I/O) operations to disk, I/O operations to the network, incoming or outgoing packet size being processed by the application, number of open connections (e.g. TCP sockets) used by the application, amount of database access required by the application, encryption extensions, virtualization extensions, as well as any other parameters that can be useful for analyzing the needs of the application. In addition, certain types of instructions of the application or the instruction pattern (e.g. floating point instructions, vector instructions) can be mapped particularly well into hardware optimizations and thus, this information can also be part of the trace information monitored and/or analyzed by the system.

In operation 503, the runtime trace information gathered by the system can be analyzed by a service to determine potential changes to the configuration of the resource stack. In alternative embodiments, the runtime trace information may not have been gathered by the system but provided to the system by the customer of the service provider. In addition, data from other customers or application owners may be utilized to determine potential changes. For example, the analysis can be a statistical analysis based on other customers of the service provider running similar applications (e.g. applications with similar workload trace information). Alternatively, the analysis can involve a technician analyzing the data and providing suggestions on modifying the configuration of the resource stack.

In operation 504, based on the analysis of the runtime information, the service provider may design a new resource stack for the application. The new resource stack may include new hardware or software resources, or modified configuration of those resources specifically optimized for the workload of the application. For example, the new resource stack may include a custom kernel or special purpose hardware devices to handle the actual workload of the application. Additionally, the new design may be based at least in part on custom input provided by application owner. Once the new design is determined, the service provider can automate the creation of the necessary resources, such as manufacturing the new hardware or instantiating the new software resources on its network.

In operation 505, the service provider may enable the customer (e.g. application owner) to execute the application on the new resource stack. By way of illustration, an option can be displayed to the customer to allow the customer to select a new resource configuration that would enable particular price and performance characteristics that are different from what the customer's application is currently experiencing. Once the user selects to upgrade to the new configuration, the service provider can take care of creating and configuring the new resource stack, and migrating the application to the new resource stack.

Figure 6:
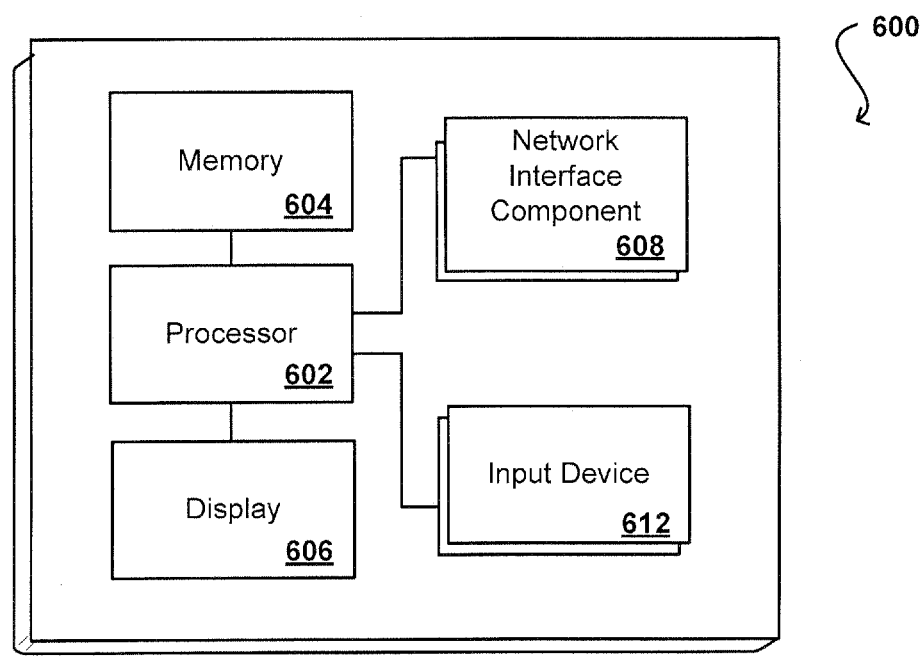
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
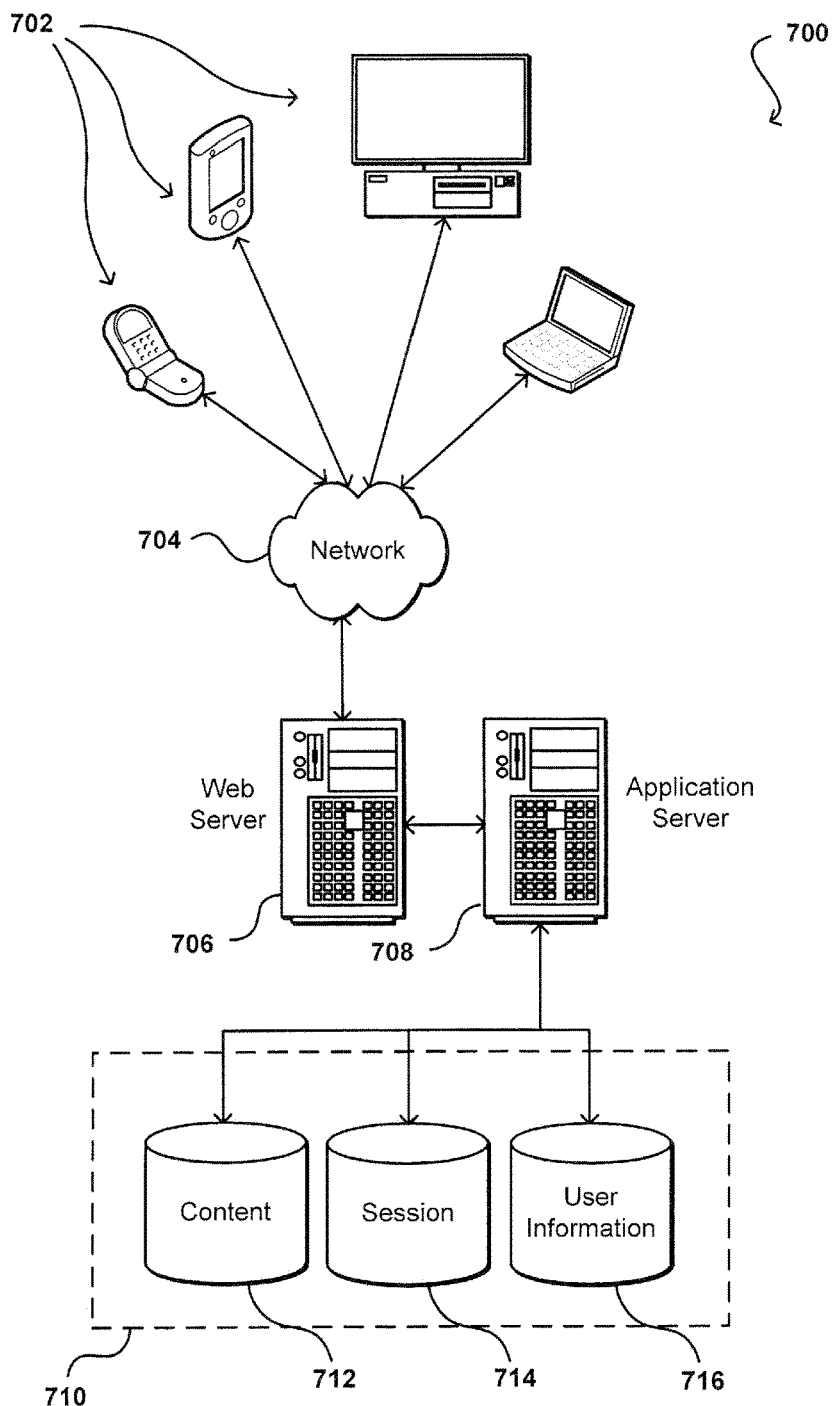
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft*, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for customizing resources for application workload deployed in a service provider environment, the method comprising:
   receiving, from a customer to the service provider environment, a request to execute at least one application, the request including configuration specifications designated by the customer;
   determining, based at least in part upon the configuration specifications, a first server instance that includes a first set of components in the service provider environment, the first server instance configured to execute the at least one application using the first set of components;
   executing the at least one application on the first server instance to process a workload at runtime using the first set of components;
   monitoring a predetermined amount of runtime trace information on the first server instance, the predetermined amount of runtime trace information corresponding to the workload processed by the at least one application using the first set of components;
   identifying, based at least in part on the predetermined amount of runtime trace information, components of the first set of components that are not being used by the workload processed by the at least one application;
   determining a kernel for a second server instance that excludes code that would allow the at least one application to interact with the components, and that utilizes a second set of components to perform the workload; and
   configuring the second server instance, in the service provider environment, to execute the at least one application on the second server instance using at least the kernel.

2. The method of claim 1, wherein configuring the second server instance further includes:
   receiving at least one hardware specification or software specification from the customer in the request; and
   constructing the second server instance based at least in part on the at least one hardware specification or software specification.

3. The method of claim 1, wherein configuring the second server instance further includes:
   determining, based at least in part on the predetermined amount of runtime trace information, that a kernel of the first server instance is handling a threshold amount of network traffic; and optimizing one or more network resources on the first server instance assigned to the at least one application processing the workload.

4. The method of claim 1, wherein configuring the second server instance further includes:
configuring a field programmable gate array (FPGA) on the second server instance for the workload of the at least one application; and
moving at least a subset of code of the at least one application to the FPGA.

5. The method of claim 1, wherein analyzing the predetermined amount of runtime trace information further includes one or more of the following:
identifying, based at least in part on the predetermined amount of runtime trace information, at least one of kernel services or device drivers on the first server instance that are not being used by the workload processed by the at least one application; and
determining a kernel for the second server instance that excludes one of the kernel services or the device drivers.

6. A computer implemented method, comprising:
executing an application on a first stack of resources that includes at least one computing device, the at least one computing device configured according to one or more specifications provided by a customer;
gathering trace information on the first stack of resources, the trace information being associated with a workload processed by the application;
analyzing the trace information to determine components associated with, but unused by, the workload processed by the application;
determining one or more modifications based at least in part on the components in order to meet at least one performance parameter when processing the workload by the application;
determining an optimized instruction sequence based at least in part on the one or more modifications; and
determining, based at least in part on the optimized instruction sequence, a kernel for a second stack of resources that includes at least the one or more modifications for executing the application, the one or more modifications in the kernel at least excluding code for allowing the application to interact with the components.

7. The method of claim 6, further comprising performing at least one of:
recompiling or re-linking the application based at least in part on the trace information in order to optimize the application for the workload.

8. The method of claim 6, further comprising:
executing the application on the second stack of resources;
continuing to gather trace information associated with the workload processed by the application on the second stack of resources; and
determining one or more new modifications to the second stack of resources based at least in part on the trace information.

9. The method of claim 6, wherein the application is provided by an application owner to a service provider, the application being executed on one of the first stack of resources or the second stack of resources owned by the service provider on behalf of the application owner.

10. The method of claim 6, wherein gathering runtime trace information further includes:
monitoring one or more of: a cache hit ratio in at least one cache used by the application, an input and output (I/O) operations to disk, I/O operations to a network, incoming or outgoing packet size being processed by the application, a number of open connections used by the application, a type of instructions of the application, a pattern associated with the type instructions, or an amount of database access required by the application.

11. The method of claim 6, wherein determining the second stack of resources further includes:
modifying a configuration of at least one software resource or hardware resource in the first stack of resources based at least in part on analyzing the trace information associated with the workload processed by the application.

12. The method of claim 6, wherein determining the second stack of resources further includes:
receiving, from an application owner of the application, input specifying a hardware specification or a software specification for the second stack of resources; and
constructing the second stack of resources based at least in part on one of the hardware specification or the software specification.

13. The method of claim 6, wherein determining one or more modifications further includes:
performing a statistical analysis based at least in part on the trace information and determining changes to configuration of at least the first stack of resources based at least in part on the statistical analysis.

14. A computing system, comprising:
at least one processor; and
memory including instructions that, when executed by the processor, cause the computing system to:
obtain, in response to a request to execute an application, runtime data associated with a workload to be processed by the application, the application being executed on a first set of resources to process the workload at runtime, the first set of resources configured according to one or more specifications provided by a customer;
analyze the runtime data to determine unused resources associated with, but not needed, for processing the workload;
determine one or more modifications for the first set of resources or a configuration of the first set of resources based at least in part on the unused resources to meet at least one performance parameter when processing the workload by the application;
determine an optimized instruction sequence based at least in part on the one or more modifications; and
provide, based at least in part on the optimized instruction sequence, a kernel for a second set of resources that includes at least the one or more modifications or the configuration the one or more modifications in the kernel at least excluding code for allowing the application to interact with the unused resources.

15. The computing system of claim 14, wherein the application is provided by an application owner to a service provider, the application being executed on one of the first set of resources or the second set of resources owned by the service provider on behalf of the application owner.

16. The computing system of claim 14, wherein obtaining the runtime data further includes:
monitoring one or more of: cache hit ratio in at least one cache used by the application, input and output (I/O) operations to disk, I/O operations to a network, incoming or outgoing packet size being processed by the application, number of open connections (e.g. TCP sockets) used by the application, a type of instructions associated with the application, an instruction pattern associated with the application, or amount of database access required by the application.

17. The computing system of claim 14, wherein providing the second set of resources further includes:
  modifying a configuration of at least one software resource or hardware resource in the first set of resources based at least in part on the analysis of the runtime data associated with the workload processed by the application.

18. The computing system of claim 14, further comprising instructions for:
  receiving, from an application owner of the application, input specifying a hardware specification or a software specification for the second set of resources; and
  constructing the second set of resources based at least in part on one of the hardware specification or the software specification.

19. The computing system of claim 14, wherein determining one or more modifications for the first set of resources further includes:
  performing a statistical analysis based at least in part on the runtime data; and
  determining changes to the configuration of the first set of resources based at least in part on the statistical analysis.

20. A non-transitory computer readable storage medium storing one or more sequences of instructions executable by one or more processors to perform a set of operations comprising:
  obtaining runtime trace information, the runtime trace information being associated with a workload processed by an application executed on a first stack of resources;
  analyzing the runtime trace information to determine components associated with, but not used by, the workload processed by the application;
  determining one or more modifications to the first stack of resources or to a configuration of the first stack of resources in order to meet at least one performance parameter when processing the workload by the application; determining an optimized instruction sequence based at least in part on the one or more modifications; and
  creating, based at least in part on the optimized instruction sequence, a kernel for a second stack of resources that includes at least the one or more modifications for executing the application, the one or more modifications in the kernel at least excluding code for allowing the application to interact with the components.

21. The non-transitory computer readable storage medium of claim 20, wherein the application is provided by an application owner to a service provider, the application being executed on one of the first stack of resources or the second stack of resources owned by the service provider on behalf of the application owner.

22. The non-transitory computer readable storage medium of claim 20, wherein obtaining the runtime trace information further includes:
  periodically inspecting one or more of: cache hit ratio in at least one cache used by the application, input and output (I/O) operations to disk, I/O operations to a network, incoming or outgoing packet size being processed by the application, number of open connections (e.g. TCP sockets) used by the application, a type of instructions associated with the application, an instruction pattern associated with the application, or amount of database access required by the application.

23. The non-transitory computer readable storage medium of claim 20, wherein creating the second stack of resources further includes:
  modifying a configuration of at least one software resource or hardware resource in the first stack of resources based at least in part on analyzing the runtime trace information associated with the workload processed by the application.

24. The non-transitory computer readable storage medium of claim 20, wherein creating the second stack of resources further includes:
  receiving, from an application owner of the application, input specifying a hardware specification or a software specification for the second stack of resources; and
  constructing the second stack of resources based at least in part on one of the hardware specification or the software specification.

25. The non-transitory computer readable storage medium of claim 20, wherein determining one or more modifications further includes:
  performing a statistical analysis based at least in part on the runtime trace information and determining at least changes to configuration of the first stack of resources based at least in part on the statistical analysis.

* * * * *